United States Patent
Lindmüller et al.

[11] Patent Number: 5,963,509
[45] Date of Patent: Oct. 5, 1999

[54] METHOD AND DEVICE FOR DISTANCE MEASUREMENT

[75] Inventors: Peter Lindmüller, Essingen; Michael Ludwig, Karlsruhe, both of Germany

[73] Assignee: Siemens Aktiengesellschaft, München, Germany

[21] Appl. No.: 09/162,521

[22] Filed: Sep. 29, 1998

[30] Foreign Application Priority Data

Sep. 30, 1997 [DE] Germany .......................... 197 43 132

[51] Int. Cl.$^6$ .................................................. G01S 13/08
[52] U.S. Cl. ........................................... 367/102; 342/122
[58] Field of Search ................................. 367/102, 101; 342/122, 128

[56] References Cited

U.S. PATENT DOCUMENTS 4,674,069  6/1987  Mizuno ..................................... 367/102
4,947,354  8/1990  Hethuin ..................................... 342/122

FOREIGN PATENT DOCUMENTS 38 51 816 T2  10/1997  Germany .
97/09638      3/1997   WIPO .

*Primary Examiner*—Daniel T. Pihulic
*Attorney, Agent, or Firm*—Kenyon & Kenyon

[57] ABSTRACT

In a distance measurement to an object, the distance measurement operating according to the FMCW principle, a linear frequency-modulated signal is transmitted and mixed with the signal reflected back from the object, generating a demodulation signal with a frequency proportional to the distance. To determine the distance, at least one estimation signal with an assumed frequency and a variable phase is generated and an estimation error is determined by comparison of the transmitted signal and the estimation signal. The phase of the estimation signal is adaptively varied for the purpose of an error reduction and the frequency of the estimation signal is corrected corresponding to the variation of the phase over time, the distance being determined from the frequency corrected in this manner.

2 Claims, 1 Drawing Sheet

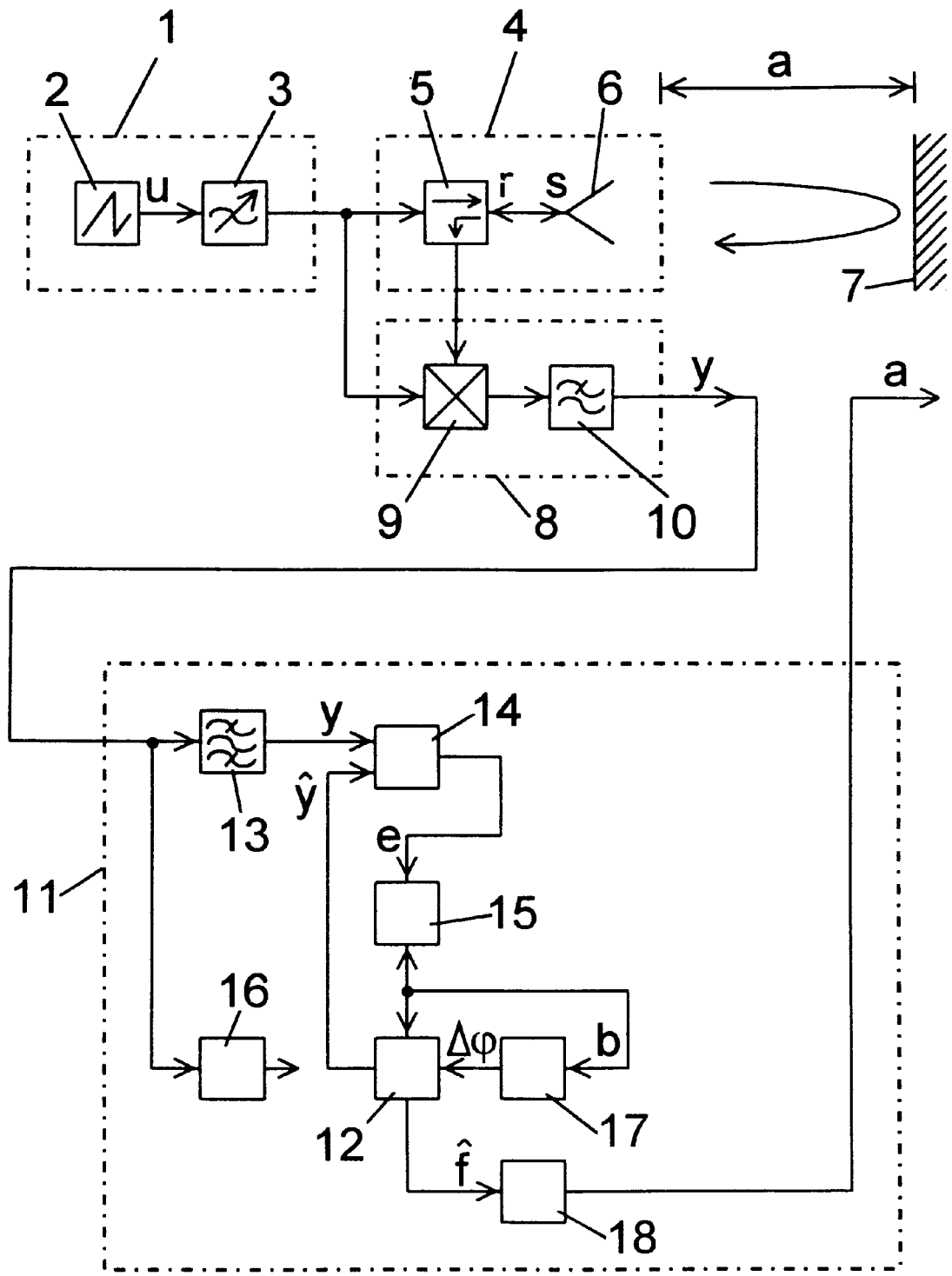

METHOD AND DEVICE FOR DISTANCE MEASUREMENT

FIELD OF THE INVENTION

The present invention relates to a method and device for distance measurement.

BACKGROUND INFORMATION

A method and device for distance measurement are described in PCT Application No. WO 97/09638. The device functions according to the FMCW principle (frequency-modulated continuous wave) and for this purpose, includes a signal source in the form of a tunable microwave oscillator which produces a linear frequency-modulated microwave signal. The frequency-modulated signal is transmitted via a transceiver and reflected against an object whose distance to the device is to be determined. The signal reflected back from the object is received by the transceiver and mixed in a demodulator with the signal intended for emission. Based on the propagation time of the received signal on its way from the transceiver to the object and back and the frequency change of the signal to be transmitted brought about in the meantime by the frequency modulation, a difference between the frequencies of the two signals is produced so that the demodulator outputs a demodulation signal with a frequency corresponding to this difference. Since the frequency modulation of the microwave signal takes place in a linear manner, the frequency of the demodulation signal is proportional to the distance between the device and the object, so that the distance can be determined directly from the frequency of the demodulation signal in an analyzing unit.

If, in addition to the actual target object, there are reflecting interference objects located in front of and behind it, a frequency spectrum is obtained for the demodulation signal which no longer allows the determination of the distance to the target object by pure frequency measurement. Plug-in connectors in the line path for the frequency-modulated signal, the edge of an antenna transmitting the signal or the bottom of a tank when a fill level is measured, for instance, act as interference objects. It is possible to subject the frequency spectrum to a Fourier analysis in the analyzing unit in order to be able to separate frequencies originating from various objects. However, due to the periodic linear, e.g., triangular or sawtooth-shaped, frequency modulation of the high-frequency signal, the Fourier transform must take place in a window of time as a result of which the frequency resolution is limited. Particularly when the distance to the target object is very small, the frequency of the demodulation signal is very low so that the ratio of the period length to the length of the window of time is less than one and may thus be too low for a Fourier transform in any case.

SUMMARY OF THE INVENTION

An object of the present invention is to provide reliable distance measurement without great computation effort even when the distance to the target object is small.

According to the present invention, the demodulation signal with its frequency spectrum originating from various reflecting objects is continuously compared with at least one estimation signal of an assumed frequency and variable phase, 1 . . . n estimation signals being formed for 1 . . . n frequencies. The particular estimation signal is corrected with respect to its phase as a function of the phase difference present between it and the demodulation signal. The phase change over time is a measure of the error of the assumed frequency of the estimation signal which must be corrected accordingly. The frequency thus corrected is used for the determination of distance. It is initially only necessary for the starting value for the assumed frequency of the estimation signal to approximate the frequency originating from the target object, so that the continuous correction of the frequency of the estimation signal takes place in the direction of the frequency originating from the target object and not in the direction of a frequency originating from an interference object. If this is the case, the frequency of the estimation signal converges in the direction of the frequency originating from the target object even if the starting value is imprecise and follows it as the distance between the device and the target object changes.

BRIEF DESCRIPTION OF THE DRAWING

The FIGURE illustrates a device for distance measurement in accordance with an exemplary embodiment of the present invention.

DETAILED DESCRIPTION

As shown in the FIGURE, the device includes a signal source 1 having a function generator 2 and an oscillator 3, in this case a microwave oscillator, which can be controlled by the function generator. Oscillator 3 generates a high-frequency signal s, in this case a microwave signal, which is frequency-modulated as a function of a linear, e.g., triangular or sawtooth-shaped, modulation function u periodically generated by function generator 2. The frequency-modulated signal s is supplied to a transceiver 4 within which it arrives at an antenna 6 via a transceiver separating filter 5 and is transmitted from there to an object 7, the distance a of which to the device, to antenna 6 in particular, is to be measured. The transmitted signal s is reflected back by object 7 and is received by antenna 6 as reflected signal r after a propagation time proportional to distance a. From there, reflected signal r arrives at a demodulator 8 via transceiver separating filter 5, the demodulator also being supplied the frequency-modulated signal s generated by signal source 1. During the propagation time of received signal r, the frequency of signal s to be transmitted has changed due to its frequency modulation so that signals s and r supplied to demodulator 8 have varying frequencies. Demodulator 8 generates at its output side a demodulation signal y having a frequency corresponding to the difference of the frequencies of the two signals s and r and for this purpose contains a signal mixer 9 with a downstream low-pass filter 10. Since the frequency modulation of signal s to be transmitted is linear over time, the frequency of demodulation signal y is directly proportional to distance a to be measured, which can thus be determined directly from the frequency of demodulation signal y in an analyzing unit 11 downstream of demodulator 8.

There is, however, the problem that additional reflecting interference objects such as the edge of antenna 6 exist in front of or behind the actual target object 7 so that demodulation signal y is made up of a frequency spectrum from which the frequency originating from object 7 must be separated.

For this purpose, an estimation signal $\hat{y}$ is determined in a signal model 12 for the portion of demodulation signal y having frequency $f_n$ which originates from the reflection of signal s against object 7. This estimation signal $\hat{y}$ has as a starting value an initially assumed frequency approximating frequency $f_n$. Furthermore, the phase angle of estimation signal ŷ is determined by at least one model parameter b of signal model 12.

Demodulation signal y, which is guided via a bandpass filter 13 if necessary, and estimation signal ŷ are compared with each other in a comparator 14. As a result of the comparison, an estimation error e is determined, on the basis of which model parameter b is modified in an algorithm designated here by a function block 15 for the purpose of reducing estimation error e. In order to obtain a continuous updating of model parameter b, a recursive algorithm is used in the embodiment shown in which each new, updated model parameter b(k) is determined as a function of the previously determined model parameters b(k−1) and the weighted estimation error e(k) in which b(k)=b(k−1)+p(k)·e(k).

With the updated model parameters b, an approximation of estimation signal ŷ to demodulation signal y is obtained with respect to its phase $\phi$ and possibly other features such as amplitude. Since estimation signal ŷ follows signal y with respect to its phase $\phi$, deviations between the assumed frequency of estimation signal ŷ and frequency $f_n$ to be simulated from it can be recorded within the frequency spectrum of demodulation signal y over the changes over time of phase $\phi$ of estimation signal ŷ. The same also applies to frequency changes caused by changes of distance a. In this connection, $\Delta\omega \cdot T_A = \Delta\phi = \phi(k) - \phi(k-1)$ applies to frequency changes or frequency deviations $\Delta\omega$ and for a scanning period $T_A$:.

A prerequisite is that the starting value of the frequency of estimation signal ŷ is in the vicinity of frequency $f_n$ to be determined so that the algorithm used converges in the direction of this frequency $f_n$ and not in the direction of a possible interference frequency.

Under defined circumstances, such as when object 7 does not move and distance a is therefore constant, the starting value of the frequency of estimation signal ŷ can be determined via a Fourier transform of demodulation signal y carried out in a computation unit 16. The computation effort for this purpose is relatively low since the frequency spectrum of demodulation signal y does not vary due to the constant circumstances and therefore sufficient time is available for computation. If distance a does not vary, an alternative possibility is to generate estimation signals ŷ in succession with varying starting values for their frequency and then to select the starting value at which the frequency of estimation signal ŷ converges to a plausible frequency value.

The calculation of the phase change $\Delta\phi = \phi(k) - \phi(k-1)$ from model parameters b takes place in a function block 17. Frequency $\hat{f}$ of estimation signal ŷ is corrected by the amount $\Delta\omega = \Delta\phi/T_A$ with the phase change $\Delta\phi$ calculated in this manner. Distance a is then directly calculated in a function block 18 from the thus corrected frequency $\hat{f}$ of estimation signal ŷ which, as explained above, approximates and follows frequency $f_n$.

The exemplary embodiment was described for the generation of an estimation signal ŷ with an assumed frequency $\hat{f}$. Correspondingly, several estimation signals can be generated for several frequencies.

What is claimed is:

1. A method for distance measurement, comprising the steps of:

generating a high-frequency signal, the high-frequency signal being a linear frequency-modulated signal;

transmitting the high-frequency to an object;

receiving a return signal reflected from the object;

determining an estimation signal having an assumed frequency and a variable phase;

generating a demodulation signal as a function of the received return signal and the high-frequency signal, the demodulation signal corresponding to a difference between the received return signal and the high-frequency signal;

generating an estimated error as a function of a comparison of the demodulation signal with the estimation signal;

adaptively modifying the variable phase to reduce the estimated error;

correcting the assumed frequency to correspond to a change of the variable phase over time; and determining a distance to the object as a function of the corrected assumed frequency.

2. A device for distance measurement, comprising:

a signal source generating a high-frequency signal, the high-frequency signal being a linear frequency-modulated signal;

a transceiver transmitting the high-frequency signal to an object and receiving a return signal reflected from the object;

a demodulator generating a demodulation signal as a function of the received return signal and the high-frequency signal, a frequency of the demodulation signal corresponding to a difference between a frequency of the high-frequency signal and a frequency of the return signal; and an analyzing unit located downstream from the demodulator determining a distance between the device and the object, the analyzing unit including:

a signal model generating an estimation signal for the demodulation signal, the estimation signal having an assumed frequency and a phase, the phase being determined by at least one variable model parameter, a comparator generating an estimation error as a function of a comparison between the demodulation signal and the estimation signal, a first arrangement adaptively varying the at least one variable model parameter to reduce the estimation error, a second arrangement determining a change in the phase of the estimation signal resulting from the adaptive variable of the at least one variable model parameter, a third arrangement correcting the assumed frequency of the estimated signal to correspond to the change of the phase of the estimation signal over time, and a fourth arrangement determining the distance to the object as a function of the corrected assumed frequency.

* * * * *